US012417711B2

United States Patent
Kikuchi

(10) Patent No.: US 12,417,711 B2
(45) Date of Patent: Sep. 16, 2025

(54) ONLINE LEARNING SYSTEM

(71) Applicant: AKAmedia Japan Inc., Tokyo (JP)

(72) Inventor: Mairu Kikuchi, Tokyo (JP)

(73) Assignee: AKAmedia Japan Inc., Tokyo (JP)

( * ) Notice: Subject to any disclaimer, the term of this patent is extended or adjusted under 35 U.S.C. 154(b) by 0 days.

(21) Appl. No.: 18/012,104

(22) PCT Filed: Jul. 28, 2021

(86) PCT No.: PCT/JP2021/027918
§ 371 (c)(1),
(2) Date: Dec. 21, 2022

(87) PCT Pub. No.: WO2022/025121
PCT Pub. Date: Feb. 3, 2022

(65) Prior Publication Data
US 2023/0252905 A1    Aug. 10, 2023

(30) Foreign Application Priority Data

Jul. 31, 2020 (JP) ................. 2020-130300

(51) Int. Cl.
*G09B 5/06* (2006.01)
*G06V 40/16* (2022.01)
*G06V 40/60* (2022.01)

(52) U.S. Cl.
CPC ........... *G09B 5/065* (2013.01); *G06V 40/172* (2022.01); *G06V 40/67* (2022.01)

(58) Field of Classification Search
CPC ....... G09B 5/065; G06V 40/67; G06V 40/172
See application file for complete search history.

(56) References Cited

U.S. PATENT DOCUMENTS

| | | | | |
|---|---|---|---|---|
| 6,652,283 B1* | 11/2003 | Van Schaack | ........... | G09B 7/04 434/323 |
| 11,645,935 B1* | 5/2023 | Smetters | ................. | G09B 7/02 |

(Continued)

FOREIGN PATENT DOCUMENTS

| | | |
|---|---|---|
| CN | 104299178 A | 1/2015 |
| CN | 109934747 A | 6/2019 |

(Continued)

OTHER PUBLICATIONS

Moini et al., Leveraging Biometrics for User Authentication in Online Learning: A Systems Perspective, Dec. 1, 2009, IEEE Systems Journal (vol. 3, Issue: 4, pp. 469-476)) (Year: 2009).*

(Continued)

*Primary Examiner* — Eddy Saint-Vil
(74) *Attorney, Agent, or Firm* — Keating & Bennett, LLP

(57) ABSTRACT

Provided is an online learning system that can guarantee that a student him/herself has attended a lecture provided and learned on-line, from start to finish. The online learning system 100 includes: a distribution control unit 15 that receives a distribution request from a student terminal 301 and distributes a lecture video stored in a lecture data storage unit; an authentication processing unit 14 which performs student face authentication during the reproduction of the lecture video based on an image captured by the student terminal; and a lecture participation progress management unit 12 that, when the student face authentication continuously fails in excess of a predetermined condition during the reproduction of the lecture video, assumes that the learning of the lecture video by the student is uncompleted. The authentication processing unit 14 performs face recognition based on an image within a range defined by a recognition frame in the image captured by the student terminal 301.

4 Claims, 14 Drawing Sheets

(56) References Cited

U.S. PATENT DOCUMENTS

| | | | | |
|---|---|---|---|---|
| 2011/0110564 | A1* | 5/2011 | Tabe | G06V 40/16 |
| | | | | 382/118 |
| 2013/0051632 | A1* | 2/2013 | Tsai | G06V 40/70 |
| | | | | 382/118 |
| 2014/0099003 | A1* | 4/2014 | Langley | G06V 40/166 |
| | | | | 382/115 |
| 2014/0222995 | A1* | 8/2014 | Razden | G09B 7/02 |
| | | | | 709/224 |
| 2016/0063235 | A1* | 3/2016 | Tussy | G06V 40/172 |
| | | | | 726/6 |
| 2016/0342826 | A1* | 11/2016 | Apostolos | G06F 21/32 |
| 2017/0039869 | A1* | 2/2017 | Gleim | G09B 5/12 |
| 2017/0186043 | A1* | 6/2017 | Pan | G06V 40/161 |
| 2017/0221371 | A1 | 8/2017 | Yang | |
| 2018/0124046 | A1* | 5/2018 | Verma | G06V 40/172 |
| 2018/0247065 | A1* | 8/2018 | Rhee | G06F 21/32 |
| 2018/0285629 | A1* | 10/2018 | Son | G06V 10/809 |
| 2019/0197220 | A1* | 6/2019 | Anderson | G09B 7/00 |
| 2020/0026837 | A1* | 1/2020 | Takashima | G06F 21/32 |

FOREIGN PATENT DOCUMENTS

| | | | | |
|---|---|---|---|---|
| CN | 111402439 A | * | 7/2020 | G06K 7/1417 |
| JP | 2009-276950 A | | 11/2009 | |
| JP | 2010086291 A | | 4/2010 | |
| JP | 2011-053969 A | | 3/2011 | |
| JP | 2018-066990 A | | 4/2018 | |
| JP | 2020-021238 A | | 2/2020 | |
| KR | 10-2002-0092515 A | | 12/2002 | |
| KR | 10-1879229 B1 | | 7/2018 | |

OTHER PUBLICATIONS

I-Fan, Liu; Ruey-Shin, Chen; Hao-Chun, Lu., An Exploration into Improving Examinees' Acceptance of Participation in an Online Exam, Journal of Educational Technology & Society 18.2: 153-165. Palmerston North: International Forum of Educational Technology & Society. (2015) (Year: 2015).*

Yap, Roland H. C.; Sim, Terence; Kwang, Geraldine X. Y.; Ramnath, Rajiv., Physical access protection using continuous authentication, 2008 IEEE International Conference on Technologies for Homeland Security, HST'08: 510-512. IEEE Computer Society. (Sep. 11, 2008) (Year: 2008).*

Saravanan, S; Palanivel, S; Balasubramanian, Facial Expression and Visual Speech based Person Authentication, M. International Journal of Computer Applications100.6 Foundation of Computer Science. (2014) (Year: 2014).*

"Galaxy Note 10 Tips How far have you been using multitasking?", IT Internet Tip, https://blog.naver.com/aiwositai/221764608514, Jan. 8, 2020, 7 pages.

Official Communication issued in International Patent Application No. PCT/JP2021/027918, mailed on Oct. 19, 2021.

Hayakawa et al., "NagaraTV—On demand movie watching system with Face Recognition", The 14th Workshop on Interactive Systems and Software, Nov. 9, 2015, 2 pages.

"AI interview candidate Test preparation environment guide", Manual for Error Handling of AI Interview Selection of Hanyang University Hospital, https://hyumc.recruiter.co.kr/bbs/appsite/notice/read/160157, Oct. 15, 2019, 6 pages.

English translation of Official Communication issued in corresponding Korean Patent Application No. 10-2023-7003242, mailed on May 16, 2024.

* cited by examiner

| | |
|---|---|
| 11 | Lecture data storage unit |
| 12 | Lecture participation progress management unit |
| 13 | Student management unit |
| 14 | Authentication processing unit |
| 15 | Distribution control unit |
| 16 | Communication unit |
| 301a~c | Student terminal |
| 201a~c | Driving school server |

| | |
|---|---|
| 21 | Student data storage unit |
| 22 | Progress data receiving unit |
| 23 | Reservation management unit |
| 26 | Communication unit |

| | |
|---|---|
| 31 | Video reproduction unit |
| 32 | Operation unit |
| 33 | Camera |
| 34 | Display |
| 36 | Communication unit |

| Item No. | Title |
|---|---|
| 1-1 | Driver's dos and don'ts |
| 1-2 | Follow signals |
| 1-3 | Follow signs and marks |
| 1-4 | Place to drive, place not to drive |
| 1-5 | Passing of intersection, etc., and railroad crossing |
| 1-6 | Priority to emergency vehicle, safe speed and vehicle distance, driving of automatic vehicle |
| 1-7 | Protection of pedestrians, etc. |
| 1-8 | Safety confirmation and sign, lane change, use of car horn |
| 1-9 | Overtaking, passing |
| 1-10 | Driver license system, traffic violation notification system |

Fig. 4

| Item No. | Title |
|---|---|
| 2-1 | Risk prediction discussion |
| 2-2 | Emergency rescue treatment I |
| 2-3 | Emergency rescue treatment II |
| 2-4 | Emergency rescue treatment III |
| 2-5 | Dead angle and driving |
| 2-6 | Behavior analysis based on aptitude test result |
| 2-7 | Human ability and driving |
| 2-8 | Natural force working on vehicle and driving |
| 2-9 | Driving under unfavorable conditions |
| 2-10 | Characteristic accidents and tragedy of accidents |
| 2-11 | Maintenance and management of vehicle |
| 2-12 | Parking and stopping of vehicle |
| 2-13 | Boarding and loading, traction |
| 2-14 | At traffic accident - Dos and don'ts of vehicle owner and insurance system |
| 2-15 | Route designing |
| 2-16 | Driving on highway |

*Fig. 5*

200
ONLINE LEARNING SYSTEM

TECHNICAL FIELD

The present invention relates to an online learning system via the Internet, and particularly relates to a system that can guarantee that a student him/herself surely has completed a class of a subject (item) that he/she must take.

BACKGROUND ART

In recent years, a learning system for allowing a lecture that is distributed in real time or has been recorded to be learned on-line via the Internet or the like, which is a so-called e-learning, has been used widely. A system used in such online learning for performing personal authentication (biometric authentication) at random timing during a lecture in order to prevent someone other than a student to be authenticated from attending the lecture (spoofing) is disclosed in, for example, Patent Document 1 shown below. Incidentally, Patent Document 1 discloses that unique information such as fingerprint, vein, iris, or retina is used as biometric authentication information.

PRIOR ART DOCUMENT

Patent Document

Patent Document 1: JP-A-2009-276950

Summary

According to the technique described in Patent Document 1, personal authentication is performed at random timing during a lecture, by using biometric authentication information, whereby spoofing attendance by a person other than a student to be authenticated can be prevented. With the system described in Patent Document 1, however, it is necessary for a student to carry out an operation for biometric authentication several times during a lecture, which possibly interferes with the learning. In addition, as a student has to perform a biometric authentication operation only at timings when the personal authentication is requested, the biometric authentication does not necessarily guarantee whether or not he/she attended to the lecture from start to finish.

In light of the above-described problem, it is an object of the present invention to provide an online learning system that can guarantee that a student him/herself has attended a lecture provided and learned on-line, from start to finish.

To achieve the above-described object, the online learning system of the present invention is an online learning system accessible from a student terminal, the online learning system including:

a lecture data storage unit that stores a lecture video;

a distribution control unit that receives a distribution request from a student terminal, and distributes a lecture video stored in the lecture data storage unit;

an authentication processing unit that performs student face authentication during reproduction of the lecture video based on an image captured by the student terminal; and a lecture participation progress management unit that, when the authentication processing unit continuously fails the student face authentication in excess of a predetermined condition during the reproduction of the lecture video, assumes that the learning of the lecture video by the student is uncompleted, wherein the authentication processing unit performs face recognition based on an image within a range defined by a recognition frame in the image captured by the student terminal.

The present invention makes it possible to provide an online learning system that can guarantee that a student him/herself has attended a lecture provided and learned on-line, from start to finish, by performing the student face authentication during reproduction of a lecture video. Such an online learning system can be utilized for, for example, classroom lectures for obtaining an automobile driver license, and lectures that are prerequisites for taking examinations of various qualifications.

BRIEF DESCRIPTION OF DRAWINGS

FIG. 4 illustrates lecture items of a first stage of classroom lectures.

FIG. 5 illustrates lecture items of a second stage of classroom lectures.

EMBODIMENTS

Figure 1:
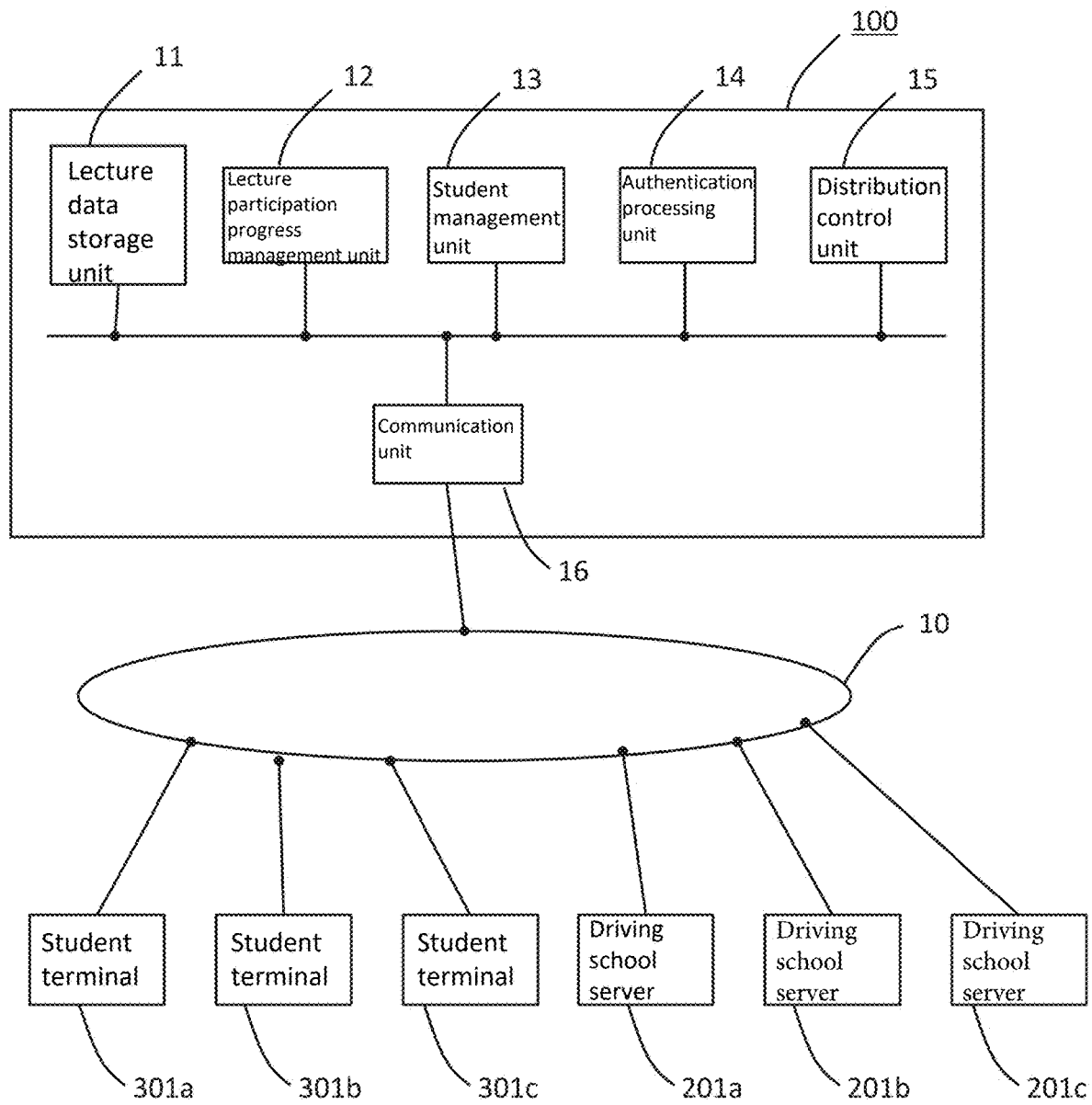
FIG. 1 is a block diagram illustrating a schematic configuration of an online learning system according to one embodiment of the present invention.

The following description describes embodiments of the present invention in detail, while referring to the drawings. Identical or equivalent parts in the drawings are denoted by the same reference numerals, and the descriptions of the same are not repeated.

FIG. 1 is a schematic diagram illustrating a schematic configuration of an online learning system 100 according to the present embodiment, as well as connection relationship between student terminals and driving school servers. The online learning system 100 disclosed herein distributes, via the Internet 10, classroom lectures of subjects obligatory for obtaining an automobile driver license.

As illustrated in FIG. 1, the online learning system 100 is connected with student terminals 301*a*, 301*b*, 301*c*, . . . as well as driving school servers 201*a*, 201*b*, 201*c*, . . . via the internet 10. In the following description, when it is not necessary to individually distinguish the student terminals from one another, the terminal is referred to simply as the "student terminal 301". Similarly, regarding the driving school servers, when it is not necessary to individually distinguish the same from one another, the server is referred to simply as the "driving school server 201". The student terminal 301 is a terminal used by a student that takes classroom lectures by using the online learning system 100. As the student terminal 301, an arbitrary terminal can be used as long as it is a terminal that can be connected to the Internet 10 such as a personal computer, a tablet, or a smartphone and that can use a Web browser. The driving school servers 201 are respective servers of "designated driving schools" designated by the respective prefectural public safety commissions under the Road Traffic Act.

The classroom lecture provided by the online learning system 100 (hereinafter referred to as "lecture of the Web lecture program") conforms with three standards to be satisfied by a designate driving school (i.e., (1) human standard, (2) physical standard, and (3) management standard).

First, regarding the human standard of (1), the lecture of the Web lecture program distributed by the online learning system 100 is a recorded video of a lecture made by a training lecturer having passed the examination of the public safety commissions. Questions and answers from/to a student are dealt with by an instructor of the driving school that the student belongs to, that is, an instructor who is arranged in the school by an administrator (responsible person) of the driving school.

Regarding the physical standard of (2), in the Web lecture program by the online learning system 100, to which a face authentication system described below is applied, cheating, spoofing attendance, etc. can be prevented and the learning progress can be managed at a level equal to or better than the level of a face-to-face lecture in a classroom of a driving school. A student using the Web lecture program receives a login ID and a password for the access to the online learning system 100, issued for the Web classroom lecture, at a driving school he/she attends. At this time, his/her face authentication registration is carried out at the driving school. While the student is learning a lecture of the Web lecture program on-line, identity verification and attendance management can be performed by performing face authentication on background at uniform time intervals or at random timings. The scheme is such that when it is impossible to perform identity verification by face authentication during a lecture, the reproduction automatically goes back to the start of the lecture. This scheme makes it possible to keep the level equal to that of a face-to-face lecture conventionally carried out in a classroom of a driving school, thereby to provide a strict learning environment for deeply understanding the attitude and knowledge for acquiring a driving license, i.e., the qualification involving a matter of life and death, and improving the achievement degree.

Regarding the management standard of (3), contents of the Web lecture program by the online learning system 100 are provided in accordance with a school curriculum (learning time, learning contents) set forth by laws, as is the case with the face-to-face lectures in a classroom of a driving school. Incidentally, a student may learn all items of the classroom lectures by the Web lecture program, or may learn a part of the same at a classroom in a driving school. For example, a student, when going to a driving school for taking driving skill training, can learn classroom lectures by utilizing spare time. In the online learning system 100, attendance management is carried out regarding the items learned at the driving school and the items learned by the Web lecture program together (details are to be described below).

A configuration and operations of the online learning system 100 are described below. As illustrated in FIG. 1, the online learning system 100 includes a lecture data storage unit 11, a lecture participation progress management unit 12, a student management unit 13, an authentication processing unit 14, a distribution control unit 15, and a communication unit 16. The lecture data storage unit 11 is realized as a storage device such as a hard disk. The lecture participation progress management unit 12, the student management unit 13, the authentication processing unit 14, the distribution control unit 15, and the communication unit 16 are realized by a server or a processor of a computer. Incidentally, these units may be realized by one computer or a peripheral device of the same, or alternatively, may be realized by a plurality of computers and peripheral devices of the same.

The lecture data storage unit 11 stores, as contents of the Web lecture program, recorded video data that are recorded data of lectures made by training lecturers at each driving school. The lecture participation progress management unit 12 stores a learning history of each student (information on which items of classroom lectures the student has finished learning). The lecture participation progress management unit 12 further cooperates with the authentication processing unit 14 in management regarding to what extent the student has watched a lecture video during the reproduction of the lecture video. The student management unit 13 manages the students login operation and the like. The authentication processing unit 14 performs identity verification of the student and checks progress during the reproduction of the lecture video. The distribution control unit 15 controls the distribution of the lecture video. The communication unit 16 communicates with student terminals 301 and driving school servers 201 via the Internet 10.

Figure 2:
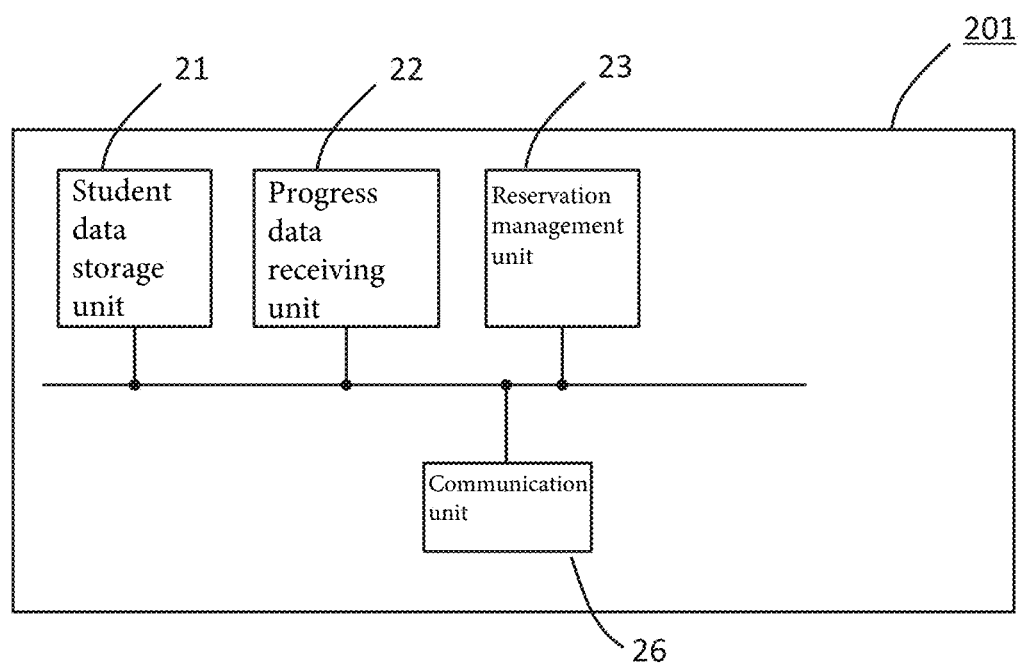
FIG. 2 is a block diagram illustrating a schematic configuration of a driving school server.

The driving school server 201 is a server that manages students at each school. The driving school server 201 may be provided at each driving school, or may be provided as a cloud server that is accessible from each driving school. As illustrated in FIG. 2, the driving school server 201 includes a student data storage unit 21, a progress data management unit 22, a reservation management unit 23, and a communication unit 26. The student data storage unit 21 stores, as information of each student belonging to the driving school, for example, basic information such as his/her name, address, telephone number, mail address, and date of birth, as well as progress data representing progress and results of classroom lectures and skill training, and the like. To a student who has applied for the use of Web lecture program, a login ID and a password for the use of the Web lecture program are issued, and information of the same is also stored in the student data storage unit 21. In addition, to take the Web lecture program, it is necessary for a student to register his/her face image for identity verification during a lecture. At a driving school, a face image of a student who has applied for the use of Web lectures is captured for face authentication, and the face image thus captured is stored in the student data storage unit 21. Alternatively, data of characteristics for authentication extracted from the face image thus captured are stored in the student data storage unit 21. Every time when a student completes the lecture of an item of the classroom lectures and the skill training, the progress data receiving unit 22 receives information of the same, and manages the same as lecture participation progress data. The reservation management unit 23 manages a reservation from a student for the face-to-face classroom lectures and the skill training at a driving school. The communication unit 26 controls communication with the student terminals 301 and the online learning system 100.

Figure 3:
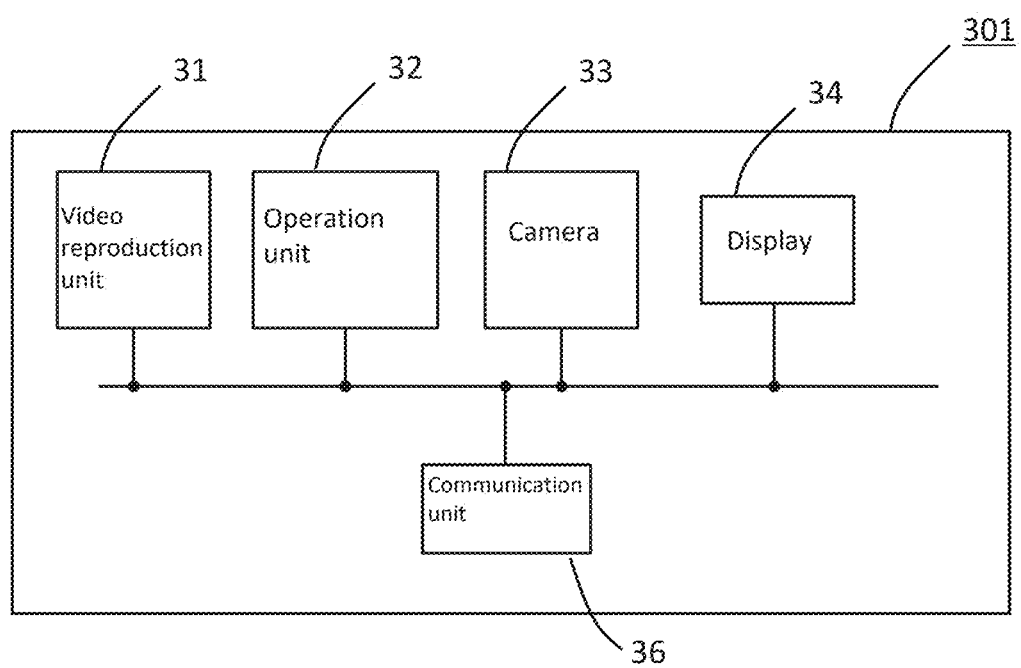
FIG. 3 is a block diagram illustrating a schematic configuration of a student terminal.

FIG. 3 is a block diagram illustrating a configuration of the student terminal 301. As illustrated in FIG. 3, the student terminal 301 includes a video reproduction unit 31, an operation unit 32, a camera 33, a display 34, and a communication unit 36. The video reproduction unit 31 is realized by a Web browser. The operation unit 32 is realized by, for example, a touch panel provided integrally with the display 34 or the like, and accepts an input from a student. The camera 33 is a camera built in the student terminal 301, and as a so-called in-camera, it is configured to be capable of capturing an image of a student in a state in which the student is viewing the display 34. The communication unit 36 controls communication with the online learning system 100 and the driving school servers 201.

A student of a driving school can log in the online learning system 100 from his/her own student terminal 301 and learn a lecture of the Web lecture program, after receiving an issued login ID and password for the Web lecture program.

The Web lecture program includes two-stage curriculum of a first stage and a second stage, as shown in FIGS. 4 and 5, as is the case with the face-to-face lectures conducted at a classroom of a driving school. Incidentally, a student of a driving school first learns a lecture of the item 1-1, "Driver's dos and don'ts" shown in FIG. 4, after entering the driving school and passing a driving aptitude examination. The Web lecture program is also configured so that a student can proceed only after watching the video of the item 1-1. The items 1-2 to 1-10 of the first stage can be learned in an arbitrary order. Only after learning all the items of the first stage, taking a learner's license mock test and taking a passing grade, the student can take a "confirmation of driving skills" test in the skill training program. After taking a "confirmation of driving skills" test in the skill training program and taking a passing grade, the student can take a learner's license test. After passing the learner's license test, the student can take second-stage trainings and lectures (on-road skill trainings and second-stage classroom lectures). Incidentally, the learner's license mock test and the learner's license test cannot be taken on-line, but must be taken on site at the driving school that he/she belongs to.

Among the classroom lectures of the second stage, the items 2-2 to 2-16 shown in FIG. 5 can be learned in an arbitrary order, but regarding the item 2-1, "Risk prediction discussion", the lecture must be learned in combination with "Risk prediction driving" in the skill training program. In addition, the items 2-2 to 2-4 are required to be learned at a driving school. The items 2-1 to 2-4, therefore, cannot be learned on-line.

Further, the item 2-15, "Route designing", must be learned before learning "Route self-designing" in the skill training program. Still further, the item 2-16, "Driving on highway", must be learned before learning "Driving on highway" in the skill training program. The reservation management unit 23 of the driving school server 201, therefore, does not accept the reservation for "Route self-designing" in the skill training program unless the item 2-15 of the classroom lectures has been learned. The reservation management unit 23 also does not accept the reservation for "Driving on highway" in the skill training program unless the item 2-16 of the classroom lectures has been learned.

After learning all the items of the classroom lectures of the second stage, the student can take a learner's license mock test, and after taking a passing grade, the student can take a "confirmation of driving skills" test in the skill training program. Incidentally, the learner's license mock test must be taken at the driving school.

Here, the learning by the Web lecture program using the online learning system 100, identity verification and progress checking during a lecture are described below. As described above, a student of a driving school can log in the online learning system 100 by entering a login ID and a password given to him/her from the driving school and using face authentication. Incidentally, a login ID and a password given to a student from a driving school are stored in the student data storage unit 21 of the school server 201 of the driving school, and at the same time, they are sent from the school server 201 to the online learning system 100 and stored in a memory accessible from the student management unit 13. In addition, the face image or the data of characteristics for authentication stored in the student data storage unit 21 of the driving school server 201 together with the login ID and the password are set to the online learning system 100 for the identity verification of the student during online learning, and are stored in a memory accessible from the student management unit 13.

Figure 6:
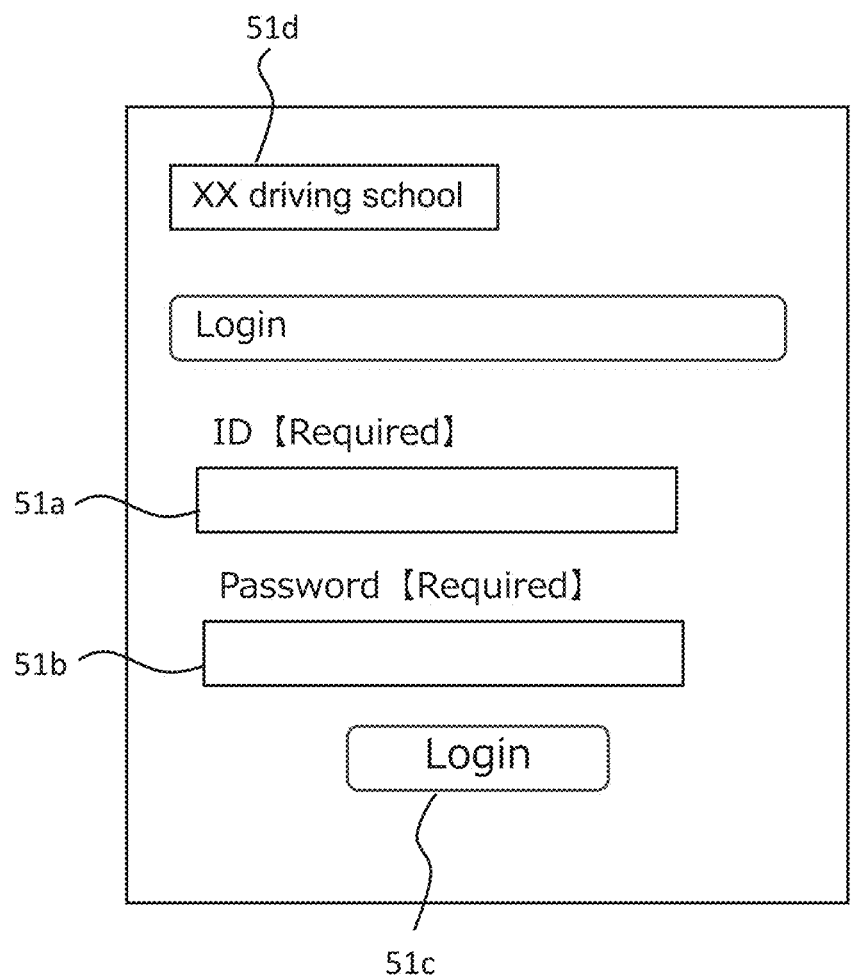
FIG. 6 is a schematic diagram illustrating an exemplary login screen displayed on a student terminal.

FIG. 6 illustrates an exemplary login screen. Incidentally, the URL of the login screen is notified from the driving school to the student by a URL or a QR code (registered trademark) or the like. FIG. 6 is a schematic diagram illustrating an exemplary login screen displayed on the student terminal 301. As illustrated in FIG. 6, entry fields 51a and 51b for the login ID and the password are displayed on the login screen. When a student enters his/her login ID and password and touches a "Login" button 51c under the same, he/she thereby is allowed to use the online learning system 100. Incidentally, at the top of the login screen, a logo 51d of the driving school having issued the login ID and the password (the driving school that the student belongs to) is displayed.

Figure 7:
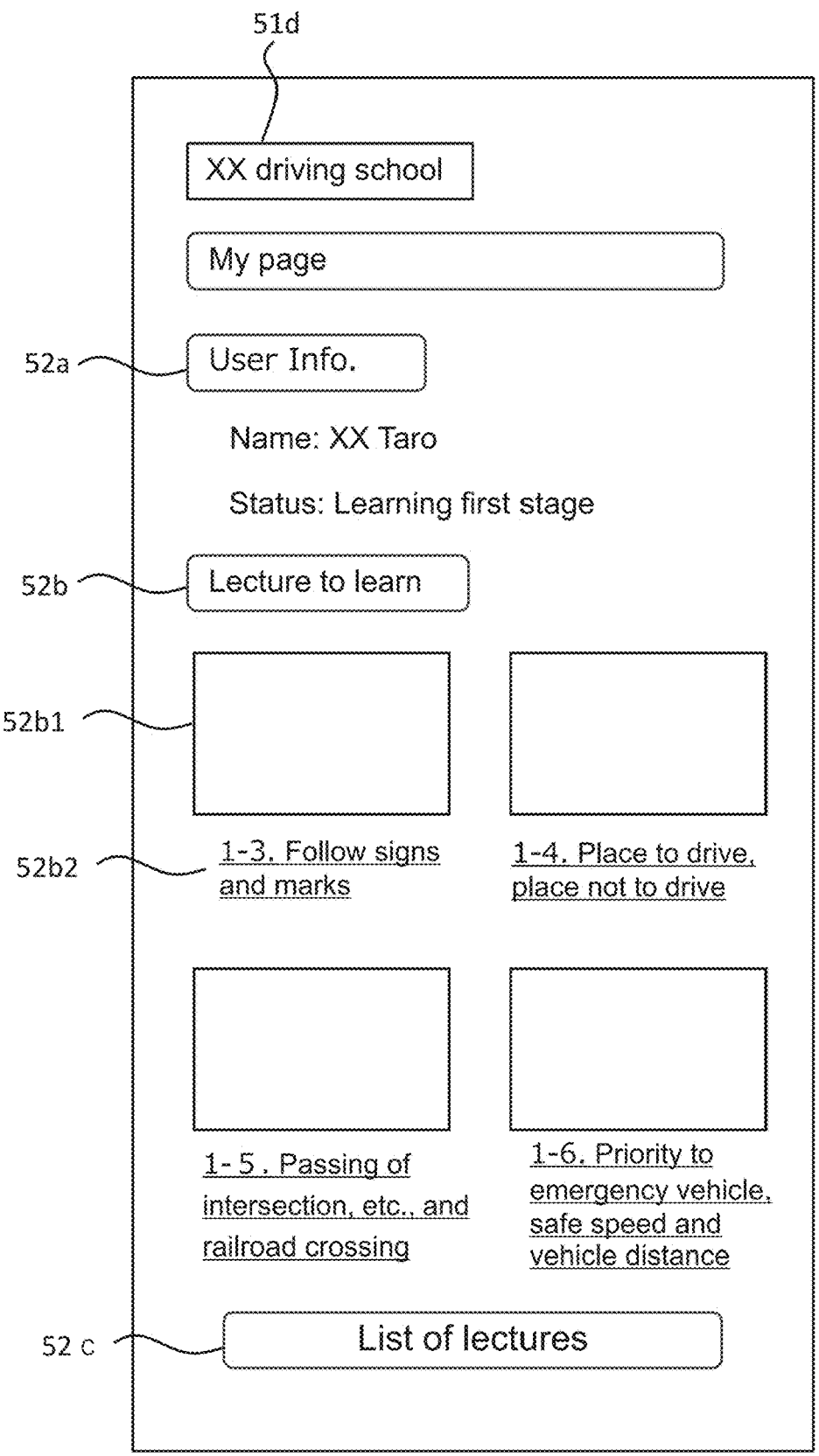
FIG. 7 is a schematic diagram illustrating an exemplary screen displayed on the student terminal after login.

FIG. 7 is a schematic diagram illustrating an exemplary "My Page" displayed on the student terminal 301 after the login. In FIG. 7, an entirety of the My Page screen is illustrated, but it is not necessary that the entirety of this screen should be displayed completely in the display screen of the student terminal 301. For example, on a smartphone or the like, the entirety of this My Page screen may be viewed by scrolling the screen.

Figure 8:
FIG. 8 is a schematic diagram illustrating an exemplary lecture list displayed on the student terminal.

In the example shown in FIG. 7, user information 52a of the student including his/her name, status, etc. is displayed on the screen of the student terminal 301. In addition, items to be learned are displayed as lectures to learn 52b. In the example of FIG. 7, among the items of the first stage, some of lectures that are not yet learned are shown with titles 52b2 thereof and thumbnail images 52b1 presenting contents thereof. In a case where there are many lectures that are not yet learned, only some of the same may be displayed on the screen, and a list of all the items of the first stage may be displayed in response to a touch on a lecture list button 52c (see FIG. 8). Incidentally, to a student who has not yet complete the first stage, only the lecture items of the first stage are displayed, so that he/she cannot select any lecture of the second stage. The titles 52b2 are hyperlinks, and when a student touches one of these, a request for distribution of the lecture video of the item of the touched one is sent from the student terminal 301 to the online learning system 100.

Incidentally, upon a touch on the lecture list button 52c, a list of all the items of the lectures of the first stage are displayed. On this list display, there are displayed an item number 53a, a title 53b, a learning progress state 53c, and a learning selection button 53d. Learned items are indicated with marks of "O" in the fields of the learning progress state 53c, whereas regarding unlearned items, marks of "x" and buttons of "Learn" are displayed in the fields. Incidentally, for a learned item, a button of "Re-learn" is displayed, and it is possible to learn the item again by touching the button. When a student selects the button of "Learn" or "Re-learn", a request for distribution of the lecture video of the item thus selected is sent from the student terminal 301 to the online learning system.

Incidentally, as described above, the lecture of the item number 1-1, "Driver's dos and don'ts" is supposed to be learned first in the first stage. Before a student learns the lecture of the item number 1-1, therefore, the button of "Learn" is displayed only for the item number 1-1, and the lecture selection button is not displayed for the other items.

In the online learning system 100, the communication unit 16 receives the request for distribution of the lecture video from the student terminal 301, and passes the same to the distribution control unit 15. The distribution request contains the students login ID, and the item number of the lecture requested to be distributed. The distribution control unit 15 inquires the student management unit 13, and confirms whether the login ID contained in the distribution request is a duly issued login ID. When the login ID is duly issued, the distribution control unit 15 extracts the lecture video of the item number requested to be distributed from the lecture data storage unit 11, and distributes the same to the student terminal 301 via the communication unit 16 and the Internet 10.

Figure 9:
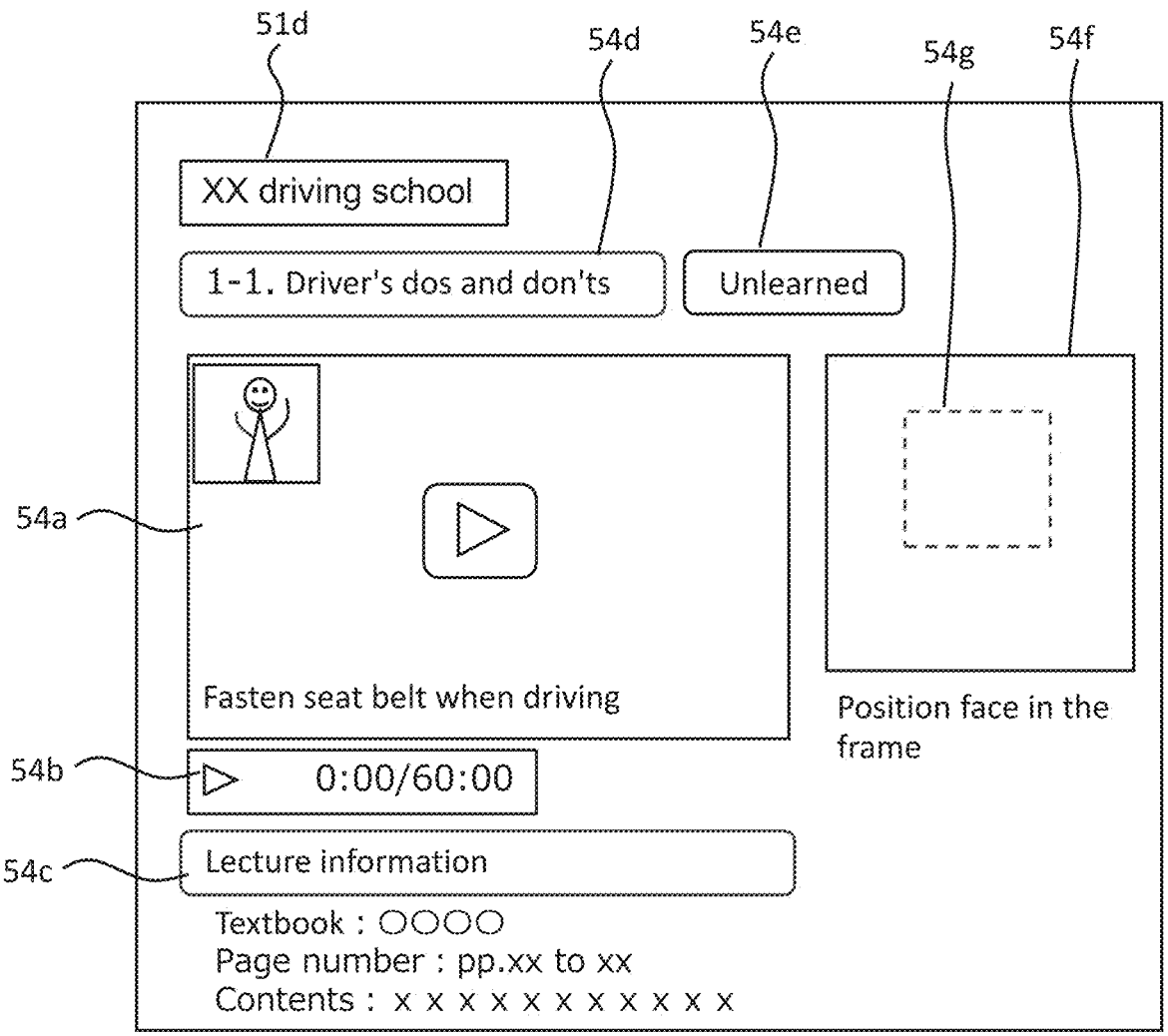
FIG. 9 is a schematic diagram illustrating an exemplary view screen for a lecture video displayed on a student terminal (personal computer, etc.).

FIG. 9 shows an exemplary display screen displaying a lecture video distributed to the student terminal 301. Incidentally, FIG. 9 shows an exemplary display screen when the student terminal 301 has a relatively large display, such as a personal computer or a tablet. An exemplary lecture video display screen of a smartphone or the like, having a small display, is to be described later. As shown in FIG. 9, a display field 54d for displaying an item number and title of a lecture being distributed, as well as a learning status field 54e are displayed in the lecture video display screen. In the example shown in FIG. 9, as the student is learning "Driver's dos and don'ts" of the item number 1-1 for the first time, "Unlearned" is displayed in the learning status field 54e. The lecture video is displayed in a lecture display window 54a. In the example shown in FIG. 9, a sign language interpretation video is displayed on the upper left side to the lecture display window 54a. In addition, Japanese subtitles are displayed in a lower part of the lecture display window 54a. Displaying a sign language interpretation video and Japanese subtitles simultaneously with the lecture video allow students having auditory difficulties also to sufficiently understand contents of the lecture. Incidentally, the configuration may be such that the language of the subtitles can be selected from languages other than Japanese. Under the lecture display window 54a, an operation window 54b is displayed in which temporary stop or resumption of reproduction is controlled, and a current reproduction point is displayed. Further under the same, the title of a textbook used in the lecture, the page number to refer to, outline information of the lecture, etc. are displayed as lecture information 54c.

In addition, an authentication window 54f is displayed on the right side to the lecture display window 54a. In the authentication window 54f, an image captured by a camera 33 built in the student terminal 301 is displayed as a motion picture, or as a still picture displayed frame by frame. The authentication window 54f indicates a range captured by the camera 33. In addition, a recognition frame 54g is displayed in the authentication window 54f. The recognition frame 54g represents a region in an image that is captured by the camera 33 and is displayed in the authentication window 54f, the region being a target of matching with the face image registered in the online learning system 100. The student, therefore, is required to watch a lecture video in such a manner that his/her face should be within the recognition frame 54g.

The authentication processing unit 14 samples (captures) an image in the recognition frame 54g at uniform time intervals, and matches the same with an image or a pattern of characteristics registered as the face image of the student. In a case where they are found to coincide with each other as a result of matching, the authentication processing unit 14 determines that the student him/herself attends the lecture, and sends information on the time when the matching was performed to the lecture participation progress management unit 12. Based on the time information received from the authentication processing unit 14, the lecture participation progress management unit 12 assumes a part from the start of the reproduction of the lecture video till the point of time that the student him/herself attends the lecture to be a learned part. For example, in a case where the authentication processing unit 14 performs matching every 10 seconds, the authentication processing unit 14 updates the point of the learned part in the watched lecture video every 10 seconds.

Figure 10:
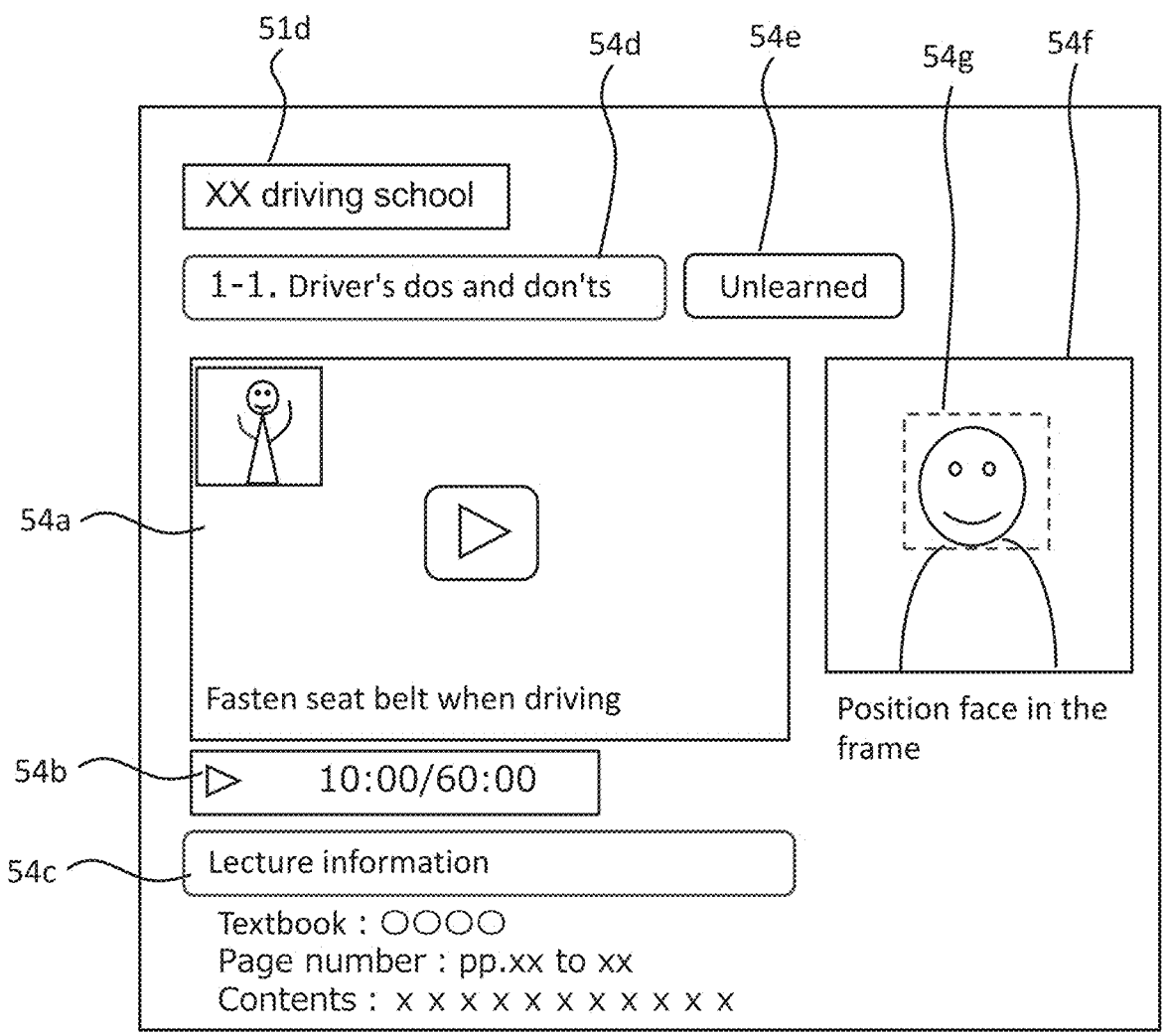
FIG. 10 is a schematic diagram illustrating an exemplary view screen for a lecture video, with a face of a student being arranged properly in a recognition frame.
Figure 11:
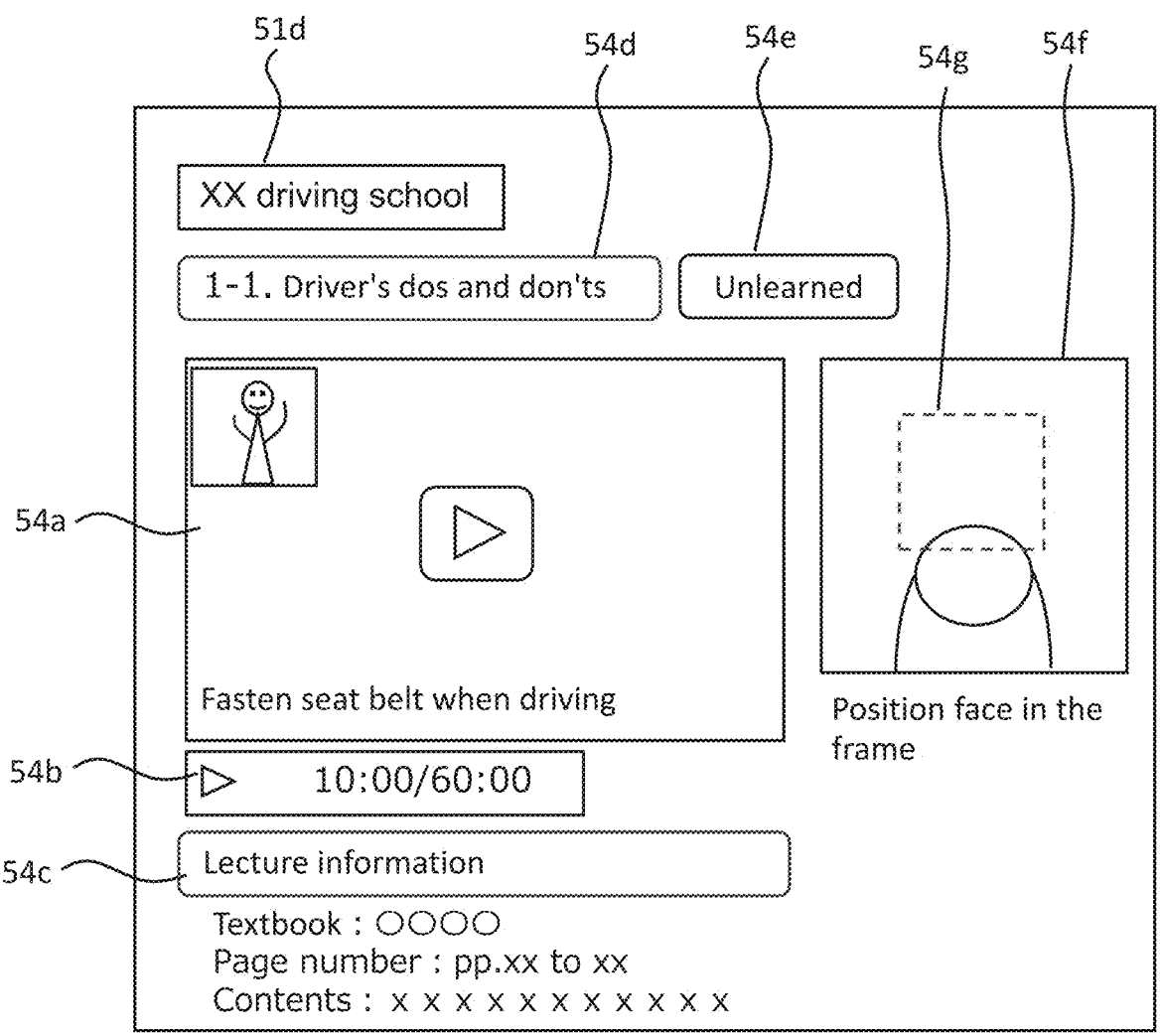
FIG. 11 is a schematic diagram illustrating an exemplary view screen for a lecture video, with a face of a student not being arranged properly in a recognition frame.

In a case where the face part of the student him/herself is within the recognition frame 54g as shown in FIG. 10, as a result of the matching by the authentication processing unit 14, it is highly probably determined that the student him/herself attends the lecture. On the other hand, even if a face part of a person who is attending the lecture video is within the recognition frame 54g but he/she is not the student him/herself, it is determined that the captured face image is different from the registered one, and the personal authentication highly probably fails. In addition, as shown in FIG. 11, even if the attending person is the student him/herself, when his/her face is not within the recognition frame 54g as a result of, for example, napping and lowering the head, the personal authentication fails, too. In addition, when the student is away from the seat, as his/her face is not within the recognition frame 54g, the personal authentication fails, too. When the personal authentication fails a predetermined times or more during attendance to a lecture of one item, or the personal authentication fails a predetermined times or more serially, the authentication processing unit 14 determines that the lecture is not properly attended. In such a case, even if the attendance continued to a midpoint or the end, the lecture participation progress management unit 12 assumes the item of the attended lecture to be "Unlearned", and this item is required to be learned again from the start of the lecture. Incidentally, at a point of time when the personal authentication fails a predetermined times or more during attendance to a lecture of one item, or at a point of time when the personal authentication fails a predetermined times or more serially, the distribution control unit 15 may stop the distribution of this lecture video.

When a student concentratedly watch the lecture, it is relatively easy for the student to maintain such a posture that his/her face is within the recognition frame 54g. In addition, as the recognition frame 54g is displayed just beside the lecture display window 54a, it is not difficult for a student to confirm whether his/her face is within the recognition frame 54g while watching the lecture display window 54a. With the online learning system 100, therefore, whether a person watching a distributed lecture video is the student him/herself can be easily and surely determined. Even if a classroom lecture is learned on-line, this makes it possible to provide a learning environment at a level equal to that in a case where the lecture is learned in a classroom of a driving school, and to guarantee the achievement degree. In addition, by performing the face authentication on background based on an image captured by the camera 33 provided in the student terminal 301 during the reproduction of a lecture video, the face authentication does not interfere with the watching of the lecture video, and a student's concentration on the lecture is not impaired, as compared with the conventional system that requires a student to perform biometric authentication voluntarily and intentionally during a lecture.

The learning of a classroom lecture on-line in this way enables a student to learn the classroom lecture on his/her convenience without limitations on the time or place for learning, which provides very high convenience to the student. For example, a classroom lecture can be learned at any time in 24 hours, which is convenient for a student who goes to work or school in daytime or a student who wants to attend a lecture at a place with a time difference on an overseas business trip. A driving school also has an advantage of, for example, avoiding securing a large space as a lecture classroom.

Incidentally, in the above-described example, the personal authentication is performed at uniform time intervals (for example, every 10 seconds), but the timing of personal authentication may be set at random. In this case, a student cannot predict a timing of personal authentication, and therefore it is possible to more surely prevent cheating such as spoofing.

Figure 12:
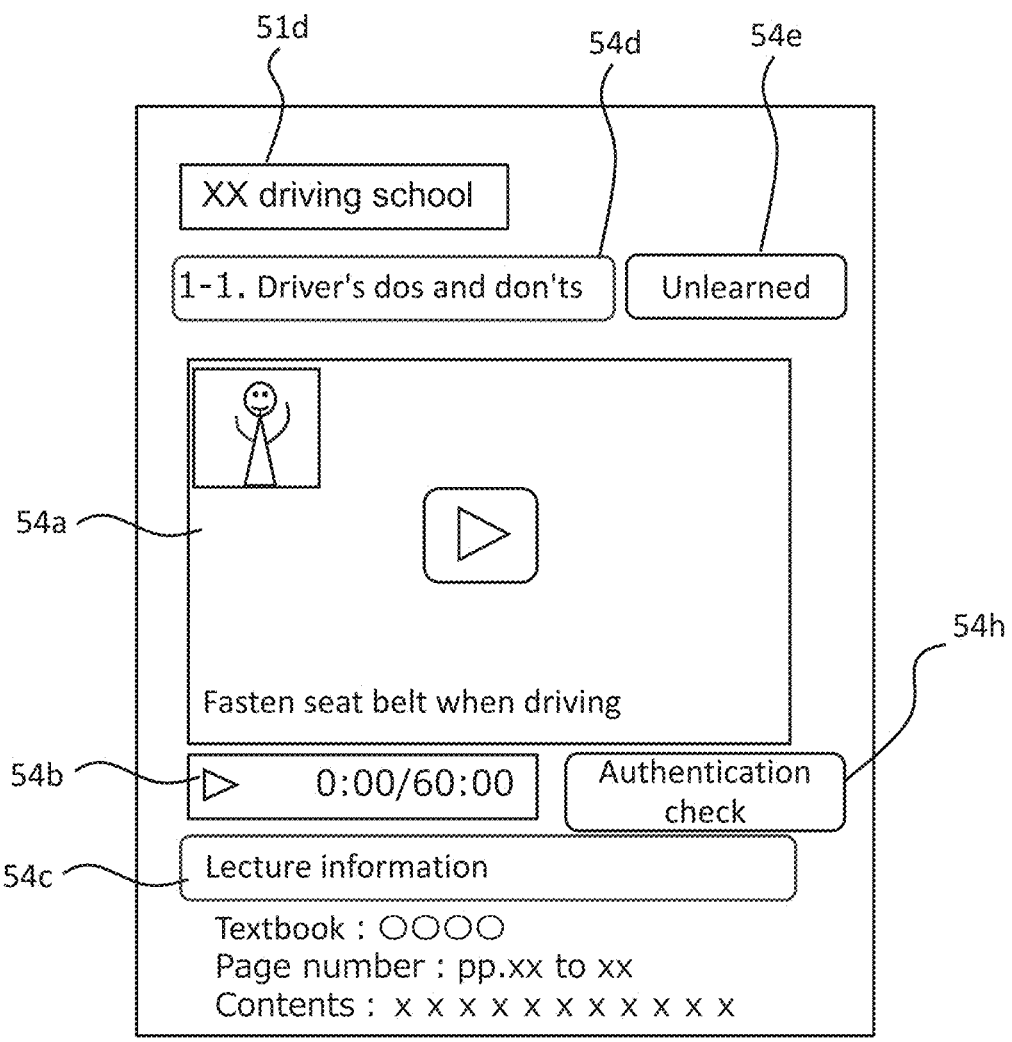
FIG. 12 is a schematic diagram illustrating an exemplary view screen for a lecture video displayed on a student terminal (smartphone).

Here, an exemplary lecture video display screen in a case where the student terminal 301 has a relatively small display like a display of a smartphone is shown in FIG. 12. As is clear from comparison between FIG. 9 and FIG. 12, a lecture video display screen for a smartphone (FIG. 12) does not have an authentication window 54f displayed on a display of a personal computer or the like (see FIG. 9). Instead, an authentication check button 54h is displayed in the vicinity of the lecture display window 54a in the display screen of the smartphone, as shown in FIG. 12.

Incidentally, even if the authentication window is not displayed on the screen, identity verification by face authentication is performed on background at uniform time intervals or at random timing during the reproduction of a lecture video.

Figure 13:
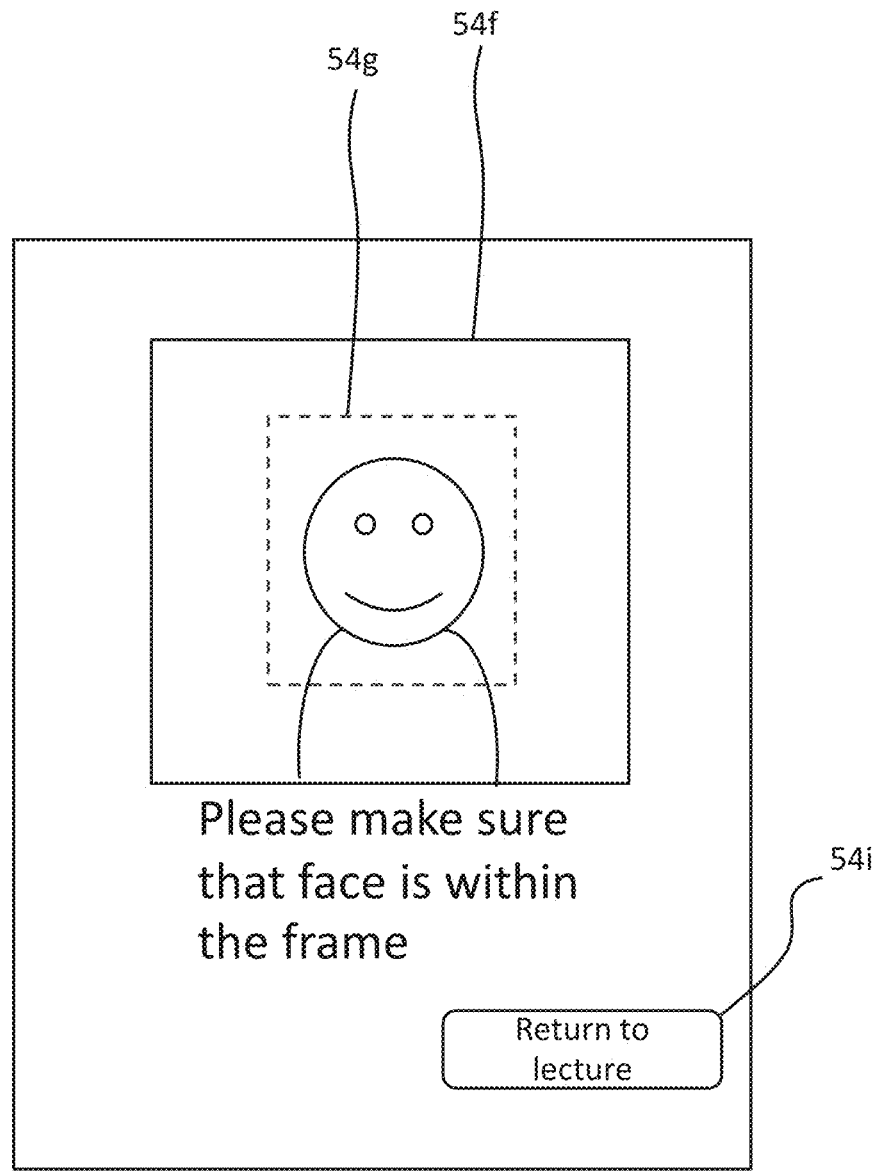
FIG. 13 is a schematic diagram illustrating an exemplary authentication window displayed on a student terminal (smartphone), with a face of a student being arranged properly in a recognition frame.
Figure 14:
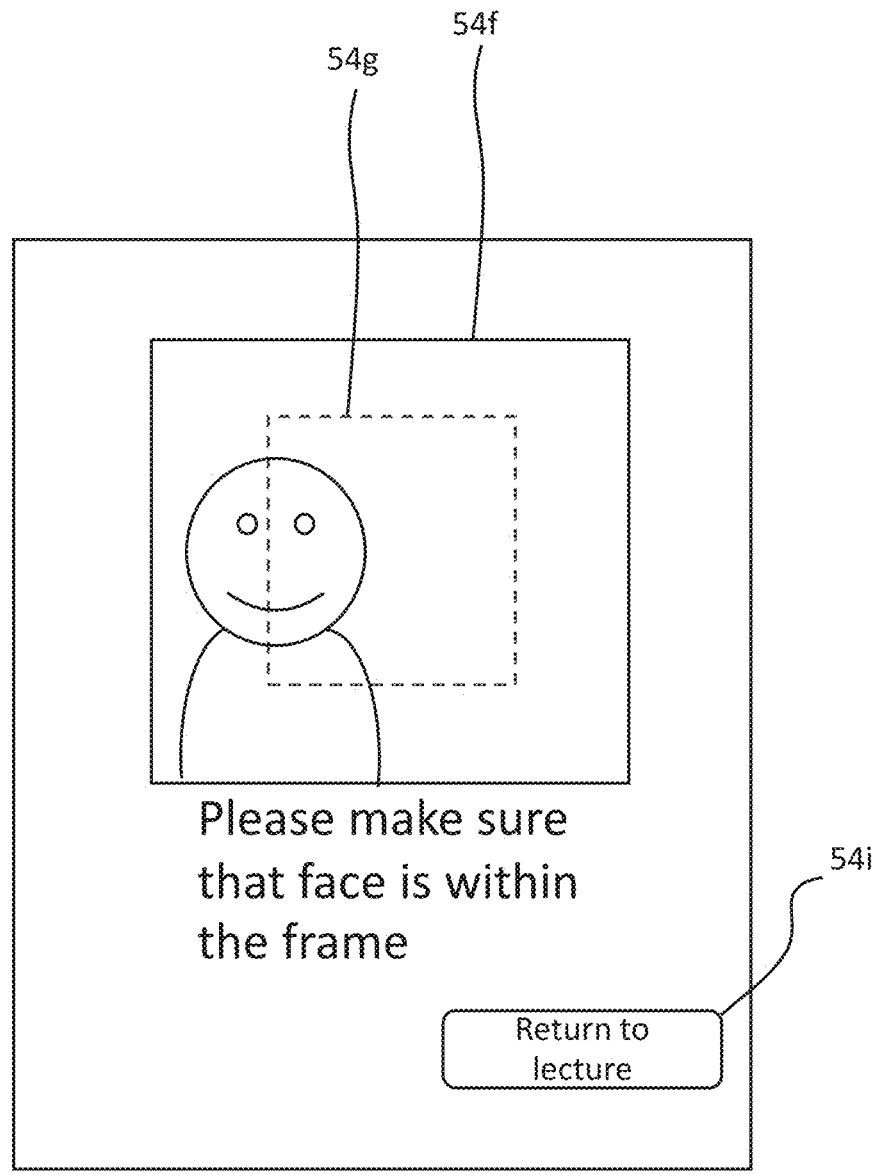
FIG. 14 is a schematic diagram illustrating an exemplary authentication window displayed on a student terminal (smartphone), with a face of a student being arranged properly in a recognition frame.

A student operates the authentication check button 54h to check whether he/she is at such a position that the face authentication is appropriately performed, with respect to the student terminal 301. More specifically, when the student touches the authentication check button 54h at the start of a lecture or during a lecture, the display screen of the smartphone switches, and the authentication window 54f as shown in FIG. 13 is displayed. The recognition frame 54g is displayed in the authentication window 54f. Here, when the face is within the recognition frame 54g as shown in FIG. 13, identity verification is performed correctly during a lecture. On the other hand, when the face is not within the recognition frame 54g as shown in FIG. 14, identity verification is not performed correctly during a lecture. The student, therefore, adjusts the angle and position of the student terminal 301 while viewing this screen. When the face comes within the recognition frame 54g, a button 54i, "Return to lecture", is touched, whereby the screen returns to the view screen for a lecture video. Incidentally, while the authentication window 54f shown in FIG. 14 is displayed, the reproduction of a lecture video is temporally stopped, so that the lecture should not proceed further.

Incidentally, the authentication window 54f is displayed upon a touch on the authentication check button 54h, in the example shown in FIG. 13. The configuration, however, may be such that by operating a temporary stop button displayed in the operation window 54b, in place of the authentication check button 54h, during the reproduction of a lecture video, the reproduction of a lecture video is temporally stopped and the authentication window 54f is displayed.

Alternatively, the configuration may be such that by swiping the screen of the smartphone, instead of operating the authentication check button 54h, the reproduction of a lecture video is temporally stopped and the authentication window 54f is displayed.

In addition, as described above, the online learning system 100 is configured so that even a student using the Web lecture program can learn a part of the lectures by attending face-to-face lectures at a driving school on site. A method for managing the learning progress in this case is described below.

For example, when a student attends a classroom lecture at a driving school before or after skill training or in spare time, the driving school server 201 issues a QR code that indicates that the student finished learning the above-mentioned classroom lecture. This QR code is presented in a state of being printed on a sheet of paper or being displayed on a display installed in a driving school, by an instructor of the classroom lecture or clerical staff of the driving school, to a student who has learned the classroom lecture. When the student reads this QR code with the student terminal 301, information contained in the QR code is sent from the student terminal 301 to the online learning system 100. The QR code contains information such as the item number of the classroom lecture that the student has learned this time, the attendance date/time, and the attendance place. The lecture participation progress management unit 12 of the online learning system 100 receives such information, and updates the learning history of the student.

In this way, in a case where a student attends a classroom lecture at a driving school, the student's learning history of classroom lectures is updated on the online learning system 100 only by reading the QR code issued at the driving school, with use of the student terminal 301. This saves time for attendance management by the student or the staff of the driving school.

Incidentally, with a view to preventing an unauthorized use of the issued QR code, the QR code is desirably a "disposable" code. More specifically, different QR codes are issued and presented on a display installed at the driving school, respectively to students who have finish learning a classroom lecture of one item. When one of the QR codes is read by one student terminal 301 and is sent to the online learning system 100, thereby causing the students learning history of classroom lectures to be updated, this QR code is invalid from then on. With this scheme, it is possible to prevent unauthorized updating of learning history by sharing a QR code.

Modification Examples

A specific example shown in conjunction with the above-described embodiment is merely one example, and is not intended to limit any embodiment of the present invention.

For example, the foregoing embodiment is described with reference to an exemplary configuration in which the student terminal 301 includes a built-in camera (in-camera) as the camera 33, but the camera for capturing a student who is attending a lecture is not limited to a built-in camera and may be an external camera that is connected to the student terminal 301 when used.

The items of classroom lectures shown in conjunction with the above-described embodiment are merely examples, and are limited to these. The lecture items specifically shown above relate to the acquisition of Class I driver license, but the system disclosed herein can be used for, for example, classroom lectures for the acquisition of Class II driver license. In addition, since the titles of the items are different in some cases depending on the driving school or the textbook used, the configuration may be such that the titles can be changed depending on the driving school.

The foregoing embodiment is described with reference to an example in which the contents of online learning are classroom lectures for the acquisition of an automobile driver license. The contents of online learning are not limited to these, but the present invention can be applied to various types of online lectures that require strict attendance management. The above-described online learning system can be used for, for example, training as a base for the certification of various qualifications as well as the maintenance/renewal of the qualifications, classes at school, etc. In addition, contents of online learning are not limited to motion pictures preliminarily recorded, but may be lectures that are made by lecturers and are distributed in real time. In a case of real time distribution, a lecture data storage unit for storing lecture videos in advance can be omitted. In addition, contents of online learning are not limited to motion pictures, but may be still pictures, or may be mixture of motion pictures and still pictures. The contents of online learning encompass such an exercise education material (drill material) that an action of display of a question as a still picture on a screen, followed by entry of an answer by a student and display of a next question as a still picture, is repeated. In addition, the exercise education material is not limited to the type that causes a student to answer a question, but may be such contents that a text or an image of the material is displayed as a still picture or a motion picture, and upon a student's operation of, for example, a "Proceed to next" button or the like, a next page (next chapter) of the material is displayed.

The foregoing embodiment is described with reference to one example in which the online learning system 100 as an example of the present invention is implemented as one or a plurality of computers and peripheral devices thereof, i.e., as hardware. The present invention, however, may be implemented as a program that causes one or a plurality of computers to execute the functions of the online learning system 100, or as a recording medium that stores the program.

Incidentally, the new configurations in this disclosure can be described as follows.

[First Configuration]

An online learning system according to the first configuration is an online learning system accessible from a student terminal, the online learning system including:

a lecture data storage unit that stores a lecture video;

a distribution control unit that receives a distribution request from a student terminal, and distributes a lecture video stored in the lecture data storage unit;

an authentication processing unit that performs student face authentication during reproduction of the lecture video based on an image captured by the student terminal; and a lecture participation progress management unit that, when the authentication processing unit continuously fails the student face authentication in excess of a predetermined condition during the reproduction of the lecture video, assumes that the learning of the lecture video by the student is uncompleted, wherein the authentication processing unit performs face recognition based on an image within a range defined by a recognition frame in the image captured by the student terminal.

With the first configuration, when face authentication is performed on background during the reproduction of a lecture video at a student terminal and the student face authentication continuously fails in excess of a predetermined condition, it is assumed that the learning of the lecture video by the student is uncompleted. This makes it possible to prevent cheating and spoofing attendance as well as to manage learning progress even if learned on-line, at a level equal to or better than the level of practical training performed face to face.

[Second Configuration]

An online learning system according to the second configuration has the first configuration further characterized in that the authentication processing unit displays an authentication window that indicates a range captured by the student terminal, and the recognition frame, on a display screen of the student terminal.

According to the second configuration, the authentication window that indicates a range captured by the student terminal, and the recognition frame, are displayed on the display screen of the student terminal, which allows a student to confirm whether his/her face is positioned within the recognition frame.

[Third Configuration]

An online learning system according to the third configuration has the second configuration further characterized in that the authentication processing unit displays the authentication window and the recognition frame, as well as a lecture video reproduction window so that they are juxtaposed on the display screen of the student terminal.

According to the third configuration, the authentication window and the recognition frame, as well as the lecture video reproduction window, are juxtaposed and displayed, which allows a student to easily confirm whether his/her face is positioned within the recognition frame, while watching the lecture video.

[Fourth Configuration]

An online learning system according to the fourth configuration has the second configuration further characterized in that the authentication processing unit displays the authentication window and the recognition frame in such a manner that these and the lecture video reproduction window are switchable to/from each other, on the display screen of the student terminal.

According to the fourth configuration, the authentication window and the recognition frame are displayed in such a manner that these and the lecture video reproduction window are switchable to/from each other. With this configuration, for example, in a case of a student terminal having a small display screen such as a smartphone, the authentication window and the recognition frame does not interfere with the watching of the lecture video.

[Fifth Configuration]

An online learning system according to the fifth configuration has the fourth configuration further characterized in that the distribution control unit temporally stops the reproduction of the lecture video when the authentication window and the recognition frame are displayed on the display screen of the student terminal, switched from the lecture video reproduction window.

With the fifth configuration, when a student switches the display screen to confirm the recognition frame, he/she does not fail to watch a lecture video.

[Sixth Configuration]

An online learning system according to the sixth configuration has any one of the first to fourth configurations further characterized in that the student face authentication is performed at random timing.

According to the sixth configuration, the face authentication is performed at random timing, whereby it is possible to more surely prevent cheating such as spoofing.

In the online learning system according to any of the first to sixth configurations, it is possible to use, as an education material, such a material that the learning of the same by a student him/herself has to be surely guaranteed, such as a lecture video of a classroom lecture for the acquisition of an automobile driver license, or a lecture video to prepare for an examination of a qualification.

Another aspect of the present configuration can also be described as follows.

[Seventh Configuration]

An online learning system accessible from a student terminal, the online learning system including:
a distribution control unit that receives a distribution request from a student terminal, and distributes an online learning material;
an authentication processing unit that performs student face authentication during distribution of the online learning material based on an image captured by the student terminal; and
a lecture participation progress management unit that, when the authentication processing unit continuously fails the student face authentication in excess of a predetermined condition during the distribution of the online learning material, assumes that the learning of the lecture video by the student is uncompleted,
wherein the authentication processing unit performs face authentication on background while the student is learning the online learning material, based on an image within a range defined by a recognition frame in the image captured by the student terminal without an operation by the student, during display of the online learning material.

[Eighth Configuration]

An online learning system accessible from a student terminal, the online learning system including:
a distribution control unit that receives a distribution request from a student terminal, and distributes a lecture video;
an authentication processing unit that performs student face authentication during distribution of the lecture video based on an image captured by the student terminal; and
a lecture participation progress management unit that, when the authentication processing unit continuously fails the student face authentication in excess of a predetermined condition during the distribution of the lecture video, assumes that the learning of the lecture video by the student is uncompleted,
wherein the authentication processing unit performs face recognition based on an image within a range defined by a recognition frame in the image captured by the student terminal without an operation by the student and without interference with the watching of the lecture video, during display of the lecture video.

The present invention disclosed therein can be implemented also as a program that can be executed by a processor of a computer accessible from a student terminal, or as a recording medium that stores the program.

DESCRIPTION OF REFERENCE NUMERALS

100: online learning system
11: lecture data storage unit
12: lecture participation progress management unit
13: student management unit
14: authentication processing unit
15: distribution control unit
16: communication unit
301: student terminal
201: driving school server

The invention claimed is:

1. An online learning system accessible from a student terminal, the online learning system comprising:
a processor; wherein
the processor is configured or programmed to:
distribute a learning contents;
perform a face authentication of a student during reproduction of the learning contents; and
determine that the learning of the learning contents by the student is uncompleted when the face authentication fails continuously in excess of a predetermined condition during the reproduction of the learning contents;
during the reproduction of the learning contents, an authentication window having a recognition frame included therein is always displayed adjacent to a reproduction window for the learning contents on a display screen of the student terminal, the authentication window indicates a range captured by the student terminal and the recognition frame defines an area in which the student should position his/her face throughout an entire period of the reproduction of the learning contents so that his/her face is correctly captured for the face authentication;
the face authentication is performed based on an image within the area defined by the recognition frame in the image captured without an operation by the student, without being noticed by the student and without interference with the watching of the learning contents during reproduction of the learning contents.

2. The online learning system according to claim 1, wherein the face authentication is performed at random timing.

3. The online learning system according to claim 1, wherein the learning contents is a lecture video of a classroom lecture for acquisition of an automobile driver license, or a lecture video to prepare for an examination of a qualification.

4. A non-transitory computer-readable medium that stores a program executed by a processor of a computer accessible from a student terminal,
the program for causing the processor of the computer to execute:

distributing a learning contents;

performing a face authentication of a student during reproduction of the learning contents; and determining that the learning of the learning contents by the student is uncompleted when the face authentication fails continuously in excess of a predetermined condition during the reproduction of the learning contents;

during the reproduction of the learning contents, an authentication window having a recognition frame included therein is always displayed adjacent to a reproduction window for the learning contents on a display screen of the student terminal, the authentication window indicates a range captured by the student terminal and the recognition frame defines an area in which the student should position his/her face throughout an entire period of the reproduction of the learning contents so that his/her face is correctly captured for the face authentication; and the face authentication in the authentication processing is performed based on an image within the range defined by the recognition frame in the image captured without an operation by the student, without being noticed by the student and without interference with the watching of the learning contents during reproduction of the learning contents.

* * * * *